June 10, 1952     F. M. IANNELLI     2,599,997
MIXING FAUCET
Filed Sept. 25, 1948     2 SHEETS—SHEET 1
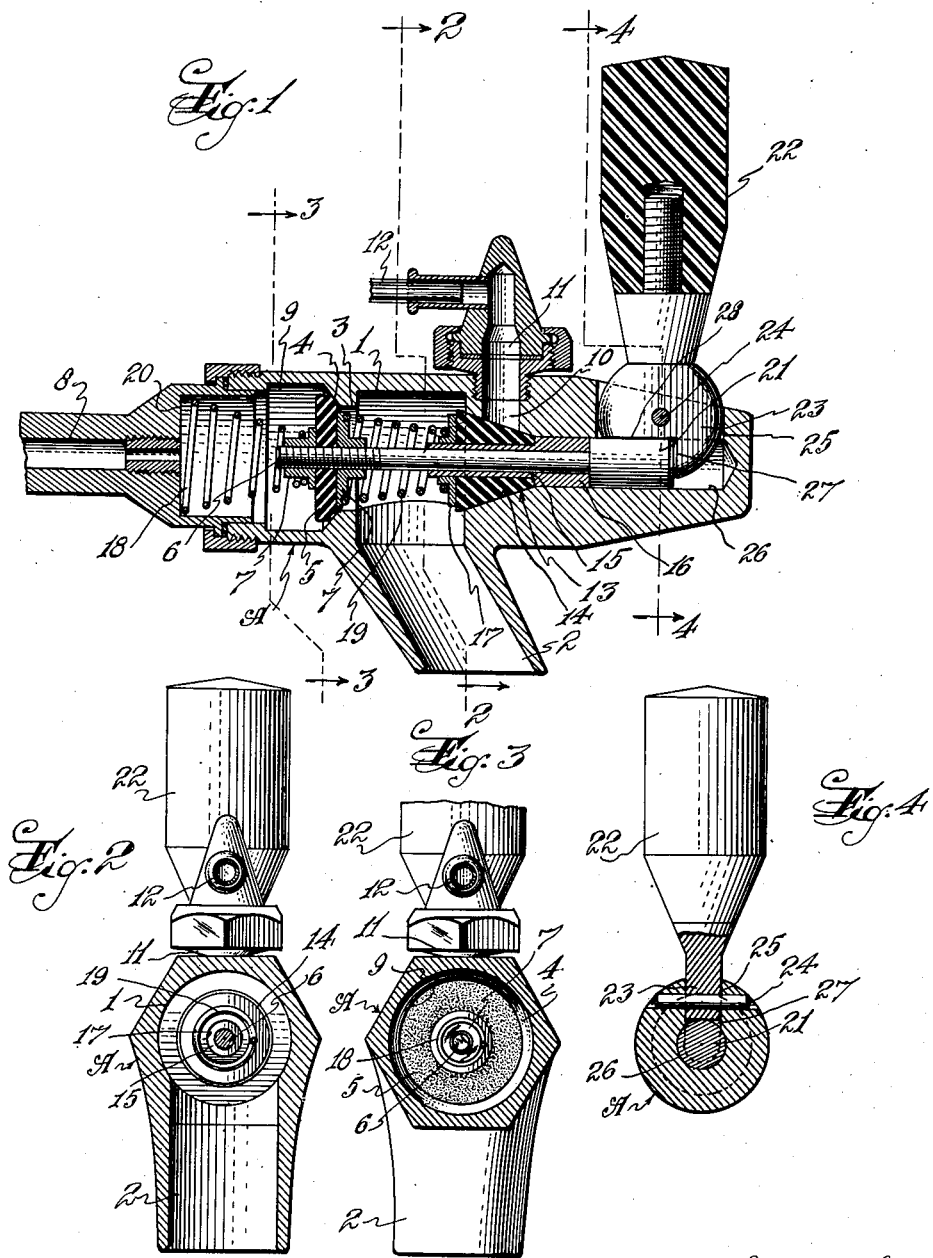

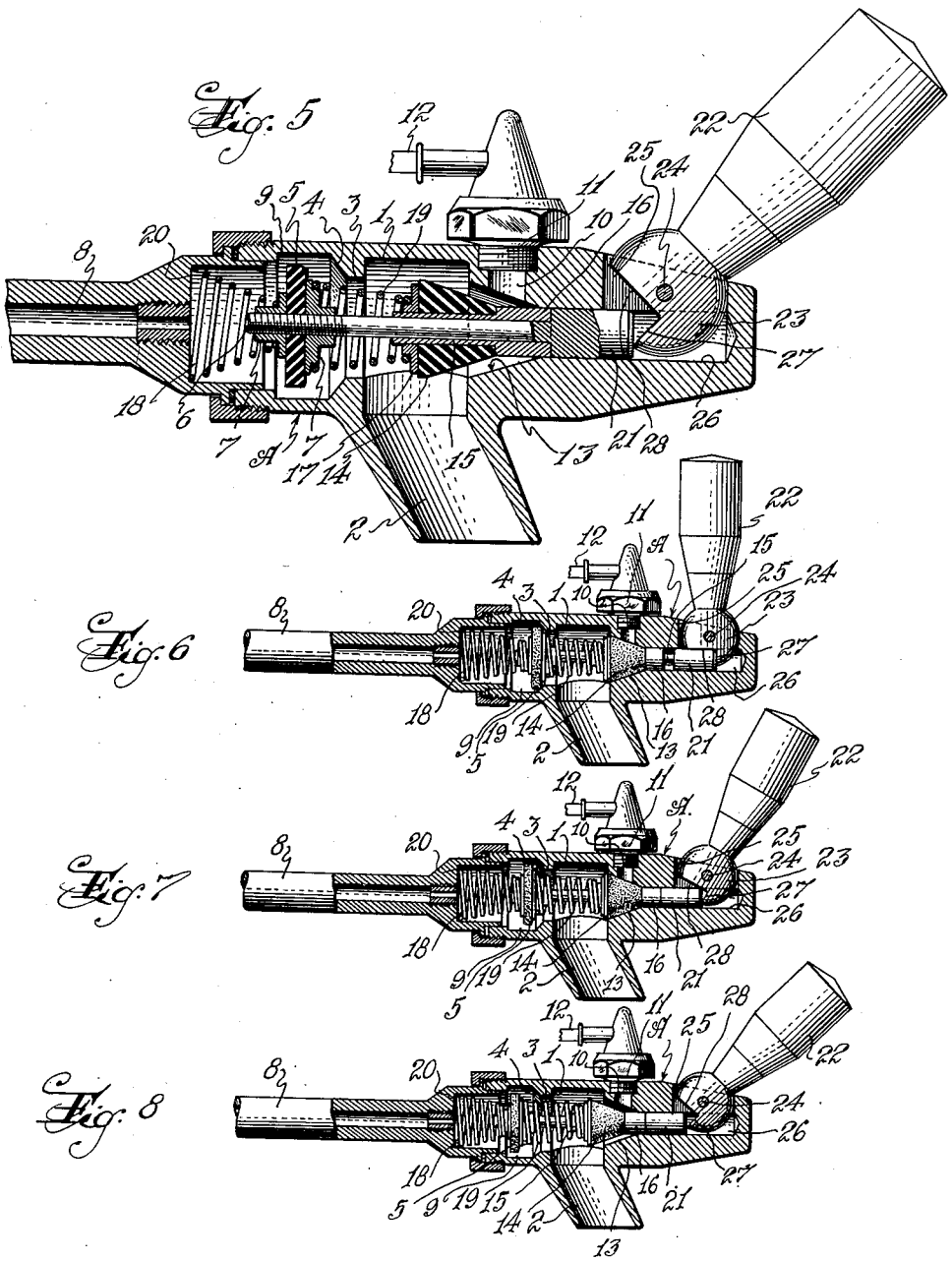

Patented June 10, 1952

2,599,997

UNITED STATES PATENT OFFICE 2,599,997

MIXING FAUCET

Frank M. Iannelli, Newark, N. J.

Application September 25, 1948, Serial No. 51,281

9 Claims. (Cl. 277—20)

1

This invention relates to liquid dispensing apparatus of the type wherein two or more liquids, for example carbonated water and a flavoring syrup, are automatically mixed and dispensed, and one object of the invention is to provide a novel and improved mixing and dispensing faucet which shall include a plurality of liquid inlet openings, flow of liquid from which through a common outlet is controlled by a valve for each inlet and a common actuating means for said valves so that selectively one of said valves may be opened independently of the other or both of said valves can be opened at the same time for discharging one or mixing the discharge of both of said liquids, respectively.

Another object is to provide a mixing faucet of this character which shall include novel and improved features of construction whereby the two valves shall be closed independently of each other to eliminate the possibility of any closing of one valve hindering the closing of the other.

A further object is to provide such a faucet wherein one of the valves shall be of the frusto-conical or tapered plug type to permit variation in the size of the inlet opening controlled thereby and thus allow for variations in the ratio between the quantities of the two liquids being dispensed, also to permit, for example, syrup having fruit pulp therein to freely flow through the inlet and valve, and to ensure opening and closing of the valve with a minimum of wear.

Still another object is to provide a valve of the type including a reciprocating valve rod for opening and closing the valve, which shall have novel and improved means for manual actuation of said valve rod.

Other objects, advantages and results of the invention will be brought out by the following description in conjunction with the accompanying drawings in which Figure 1 is a central vertical longitudinal sectional view through a mixing faucet embodying the invention with certain parts shown in side elevation, showing the faucet in closed condition;

Figures 2, 3, and 4 are transverse vertical sectional views approximately on the planes of the lines 2—2, 3—3, and 4—4, respectively of Figure 1;

Figure 5 is a view similar to Figure 1 showing the faucet in open condition;

Figure 6 is a view similar to Figure 1 showing a modification of the invention and showing the faucet in closed condition;

Figure 7 is a similar view showing one of the valves in open condition and the other valve closed, and

2

Figure 8 is a view like Figure 7 showing both valves in open condition.

Specifically describing the embodiment of the invention illustrated in Figures 1 to 5 inclusive, the reference character A designates the valve casing which has a discharge chamber 1 therein from which leads a discharge spout 2.

At one end of the chamber 1 is a valve port 3 having a valve seat 4 with which cooperates a disk valve 5 that is adjustably mounted on a valve rod 6 between two nuts 7 that are screw threaded on the valve rod at opposite sides of the disk. This valve 5 controls the flow of one liquid, for example carbonated water, from a supply pipe 8 and an inlet chamber 9 to the discharge chamber 1.

At the end of the discharge chamber 1 opposite the valve port 3 and in axial alignment therewith is another inlet port 10 which is connected by a suitable coupling 11 to a supply pipe 12 from a source of a second liquid, for example a flavoring syrup. The valve port 10 opens through a frusto-conical tapered valve seat 13 in the valve casing with which cooperates a frusto-conical or tapered valve plug 14 which is carried by a sleeve 15 which in turn is slidably mounted on the valve rod 6 and has a cylindrical head 16 at one end which forms a stem for said valve plug. The valve plug 14 is clamped between said head and a nut 17 which is screw threaded on the other end of the clamp.

The valve disk 5 and the valve plug 14 are normally held against their respective seats by the respective springs 18 and 19, the former of which is interposed between a shoulder 20 on the inlet pipe 8 and one of the nuts 7, while the latter is interposed between one nut 7 and the nut 17. The spring 18 is preferably somewhat stronger than the spring 19 so that the valve disk 5 may be firmly seated after the valve plug 14 has been seated, the spring 19 yielding to permit this action and thus ensure that the valve 14 shall not hinder the closing of the valve disk 5.

For actuating of the valve disk and valve plug into open positions, the valve rod 6 is provided with a head 21 to cooperate with a hand-operated actuating lever which is shown as comprising a hand piece 22 having a hub 23 pivotally mounted at 24 on the valve casing within a slot 25 that opens into a cylindrical bore 26 in which the heads 21 and 16 of the valve rod 6 and sleeve 15 are nicely slidable. The hub 23 has an angular notch cut in the edge thereof to form a lever or arm 27 to abut the end of the head 21 when the hand piece 22 is swung in one direction, that is, to the right in Figure 1, as shown in Figure 5.

Said notch also forms a stop shoulder 28 to limit the swinging of the hand lever in the opposite direction by abutment with the side of head 21.

When it is desired that both the valve disk and the valve head shall be actuated into open position at the same time, they will be so related on the valve rod that when they are in closed position the head 16 of the sleeve 15 will approximately abut the head 21 of the valve rod as shown in Figure 1. Then when the hand lever 22 is swung to the right in Figure 1, both of the valves will be opened at the same time as shown in Figure 5.

However, should it be desired to actuate the valve disk 5 into open position prior to the opening of the valve plug 14, the parts will be so adjusted that when the two valves are closed, the head 16 of the sleeve 15 will be spaced from the head 21 of the valve rod as shown in Figure 6. With this arrangement, when the hand lever 22 is swung to the right, first the valve disk 5 will be actuated into open position as shown in Figure 7, without disturbing the valve plug 14, and continuation of said swinging of the hand lever will then cause opening of the valve plug 14 as shown in Figure 8. The necessary adjustments can be made in various ways, but the most convenient way is to shorten the head 16 so as to increase the distance between the heads 16 and 21 when both valves are in closed position as shown in Figure 6.

An important feature of the tapered plug 14 and tapered valve seat is that the inlet openings 10 may be made of various sizes in a valve seat of given dimensions so as to vary the capacity of the inlet opening 10 and to facilitate adjustment of the ratio between the amounts of the two liquids to be dispensed. A large inlet opening 10 is desirable in some cases to permit the free flow of pulp into the mixing and discharging chamber 1 without danger of clogging and the tapered valve seat is more or less self-clearing. Moreover, seating and unseating of the tapered plug and tight compression thereof against the valve seat can be effected with a minimum of wear.

It will thus be understood by those skilled in the art that with the valve constructed and adjusted as shown in Figures 1 to 5 inclusive, the two valves will normally be held in closed position and the hand lever 22 will be swung into upright position by the head 21 of the valve rod. When the hand lever is swung to the right, both valves are opened simultaneously to permit the two liquids to flow through the respective inlet valve ports 3 and 10 into the mixing chamber 1 where the liquids are mixed and thence discharged through the spout 2. When the faucet is adjusted as shown in Figures 6 to 8 inclusive, the two valves are held in closed position by their respective springs and the hand lever is held upright in the same manner as shown in Figure 1, but when the hand lever is swung to the right a certain distance, the valve disk 5 is opened to permit flow of only one liquid, for example carbonated water, through the discharge spout, while when the hand lever is pulled further in the same direction, the valve plug 14 will be opened and both liquids will flow into the mixing chamber and through the discharge spout.

The mounting of both valve heads 5 and 14 on the common reciprocable valve rod 4 and the yielding sliding movement of one valve head relative to the other valve head after the latter has been seated provides a simple, inexpensive, reliable and easily operable faucet and ensures positive, firm closing of both valves.

While I have shown and described the faucet as embodying certain details of construction, it will be understood that this is primarily for the purpose of illustrating the now preferred embodiment of the invention and that many modifications and changes may be made in the structure of the faucet within the spirit and scope of the invention.

I claim:

1. A mixing and dispensing faucet comprising a casing having a discharge chamber formed with an open discharge spout, two coaxial inlet valve ports, one in each of opposite end walls of said discharge chamber and a valve seat for each thereof, a valve rod reciprocable in said casing, a valve head on said valve rod for each of said seats, one of said valve heads being movable relatively to said valve rod, means including springs for actuating said valve heads into engagement with their respective seats and permitting movement of the other of said valve heads to its seat after the first-mentioned valve head has engaged its seat, there being means to cause positive movement of both of said valve heads by said valve rod in the direction to open the valves and means for actuating said valve rod to move said valve heads into open position.

2. The mixing and dispensing faucet as defined in claim 1 wherein one of said valve heads is slidable on said valve rod and with the addition of stop means for limiting sliding movement of said valve head in the direction to engage its seat, and wherein said spring means comprises a compression spring for actuating said valve rod and the other valve head and a second compression spring mounted on said valve rod and normally influencing said slidable valve head toward said stop means.

3. A mixing and dispensing faucet as defined in claim 1 wherein the second-mentioned valve seat is frusto-conical and the corresponding inlet port opens laterally therethrough intermediate the length thereof, and the corresponding valve head comprises a frusto-conical plug.

4. A mixing and dispensing faucet as defined in claim 1 wherein the second-mentioned valve seat is frusto-conical and the corresponding inlet port opens laterally therethrough intermediate the length thereof, and the corresponding valve head comprises a frusto-conical resilient plug slidably mounted on said valve rod, and the first-mentioned means includes a compression spring for actuating said valve rod and the first mentioned valve head into engagement with its seat, and a second compression spring on said valve rod normally influencing the second-mentioned valve head toward its seat.

5. A mixing faucet as defined in claim 4 wherein said valve rod has a stop to be abutted by and to limit sliding movement of said second-mentioned valve head under influence of its spring.

6. A mixing and dispensing faucet comprising a casing having a discharge chamber formed with an open discharge spout, two coaxial inlet valve ports, one in each of opposite end walls of said discharge chamber and a valve seat for each thereof, a valve rod reciprocable in said casing, a valve head on said valve rod for each of said seats, one of which is slidable on said valve rod, means including springs for actuating said valve heads into engagement with their respective seats and for permitting movement of said valve rod and the other valve head relative to the first-mentioned valve head in one direction to cause the second-mentioned valve head to firmly engage its seat after the first-mentioned valve head has engaged its seat, there being means to cause positive movement of both of said valve heads by said valve rod in the direction to unseat said valve heads and means engaging said valve rod to actuate the latter in opposite direction for unseating said valve heads.

7. A mixing and dispensing faucet as defined in claim 6 wherein said valve rod has an abutment to engage and move said first-mentioned valve head upon movement of the valve rod in the second-mentioned direction and the extent of said relative movement of said valve rod and said first-mentioned valve after seating of the latter is such that said abutment on the valve rod engages said first-mentioned valve after the second-mentioned valve head has been unseated, thereby providing for successive unseating and substantially simultaneous seating of said valve heads.

8. The mixing and dispensing faucet as defined in claim 1 wherein said casing has a cylindrical bore leading from one of said valve seats away from said discharge chamber, the valve corresponding to said valve seat is slidable on said valve rod and has a cylindrical stem nicely slidable in said bore, said valve rod has a cylindrical head also slidable in said bore and to abut said slidable valve, said spring means includes a spring for normally influencing said slidable valve toward said head.

9. The mixing and dispensing faucet as defined in claim 1 wherein said casing has a cylindrical bore leading from one of said valve seats away from said discharge chamber, the valve corresponding to said valve seat is slidable on said valve rod and has a cylindrical stem nicely slidable in said bore, said valve rod has a cylindrical head also slidable in said bore and to abut said slidable valve, said spring means includes a spring for normally influencing said slidable valve toward said head, said casing has a slot leading into said bore, and said means for actuating said valve rod includes a hand lever pivoted on said casing in said slot and having an arm to abuttingly engage the end of said head on the valve rod.

FRANK M. IANNELLI.

REFERENCES CITED

The following references are of record in the file of this patent:

UNITED STATES PATENTS

| Number | Name | Date |
|---|---|---|
| 580,279 | Healey | Apr. 6, 1897 |
| 1,173,672 | Macloskie | Feb. 29, 1916 |
| 1,957,082 | Schneible | May 1, 1934 |
| 2,164,911 | Garviek | July 4, 1939 |
| 2,308,408 | Wall | Jan. 12, 1943 |

FOREIGN PATENTS

| Number | Country | Date |
|---|---|---|
| 296,667 | Italy | of 1932 |